United States Patent

Ginosar et al.

[11] Patent Number: 5,931,944
[45] Date of Patent: Aug. 3, 1999

[54] BRANCH INSTRUCTION HANDLING IN A SELF-TIMED MARKING SYSTEM

[75] Inventors: Ran Ginosar, Nofit; Rakefet Kol, Haifa, both of Israel; Kenneth Scott Stevens, Hillsboro, Oreg.; Peter A. Beerel, Long Beach; Kenneth Yi Yun, San Diego, both of Calif.; Christopher John Myers, Salt Lake City, Utah; Shai Rotem, Beaverton, Oreg.

[73] Assignee: Intel Corporation, Santa Clara, Calif.

[21] Appl. No.: 08/996,756

[22] Filed: Dec. 23, 1997

[51] Int. Cl.⁶ ...................................................... G06F 9/30
[52] U.S. Cl. ........................ 712/239; 712/204; 712/210; 712/212; 712/213; 712/206
[58] Field of Search .................................... 712/204, 206, 712/210, 212, 213, 239

[56] References Cited

U.S. PATENT DOCUMENTS

| | | | |
|---|---|---|---|
| 5,488,710 | 1/1996 | Sato et al. ............................... | 712/210 |
| 5,535,347 | 7/1996 | Grochowski et al. ................... | 712/204 |
| 5,752,069 | 5/1998 | Roberts et al. ......................... | 712/219 |
| 5,758,116 | 5/1998 | Lee et al. ................................ | 712/210 |
| 5,852,727 | 12/1998 | Narayan et al. ........................ | 712/215 |
| 5,870,599 | 2/1999 | Hinton et al. ........................... | 712/239 |

*Primary Examiner*—William M. Treat
*Attorney, Agent, or Firm*—Kenyon & Kenyon

[57] ABSTRACT

An instruction execution pipeline in a computer system having variable-length instructions uses branch prediction to perform self-timed marking of instructions prior to decoding. Branch handling logic is provided in an instruction marking circuit to directly mark a target instruction of a predicted branch as the next instruction to be decoded. Additionally, a branch target FIFO may be used to store information about the location of the target instruction in the instruction stream.

23 Claims, 15 Drawing Sheets

Fig. 2.1
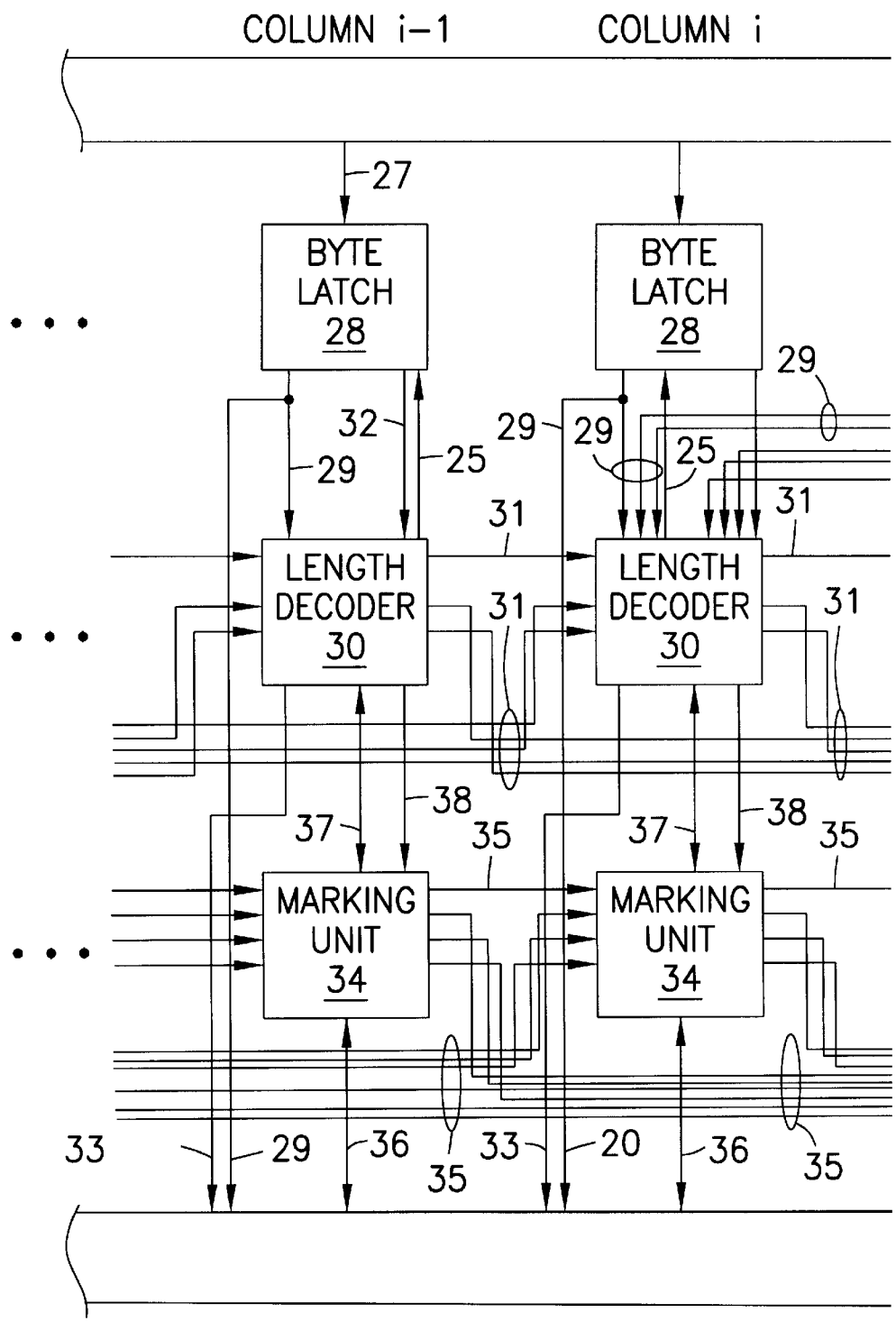

Fig. 2.2
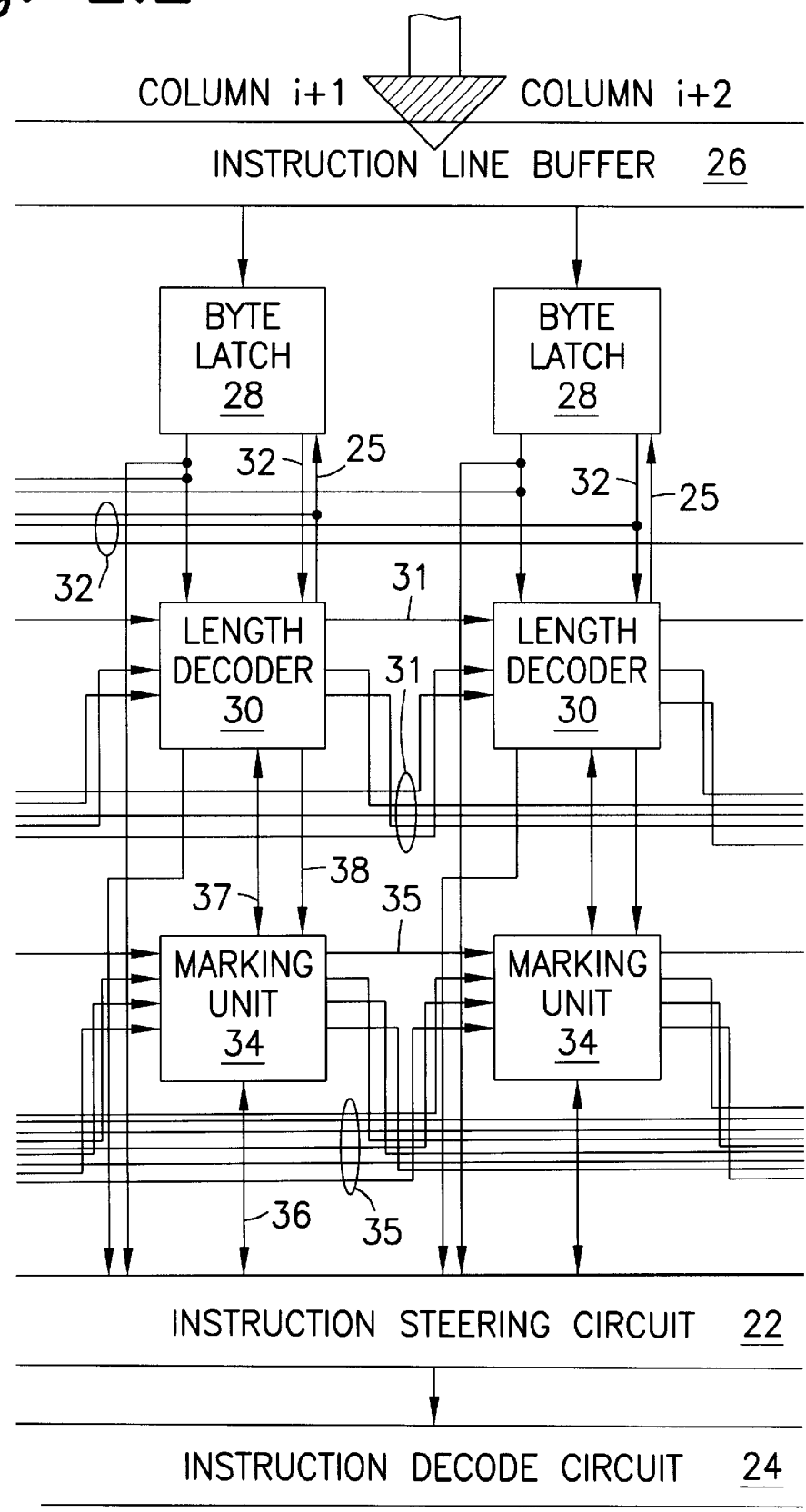

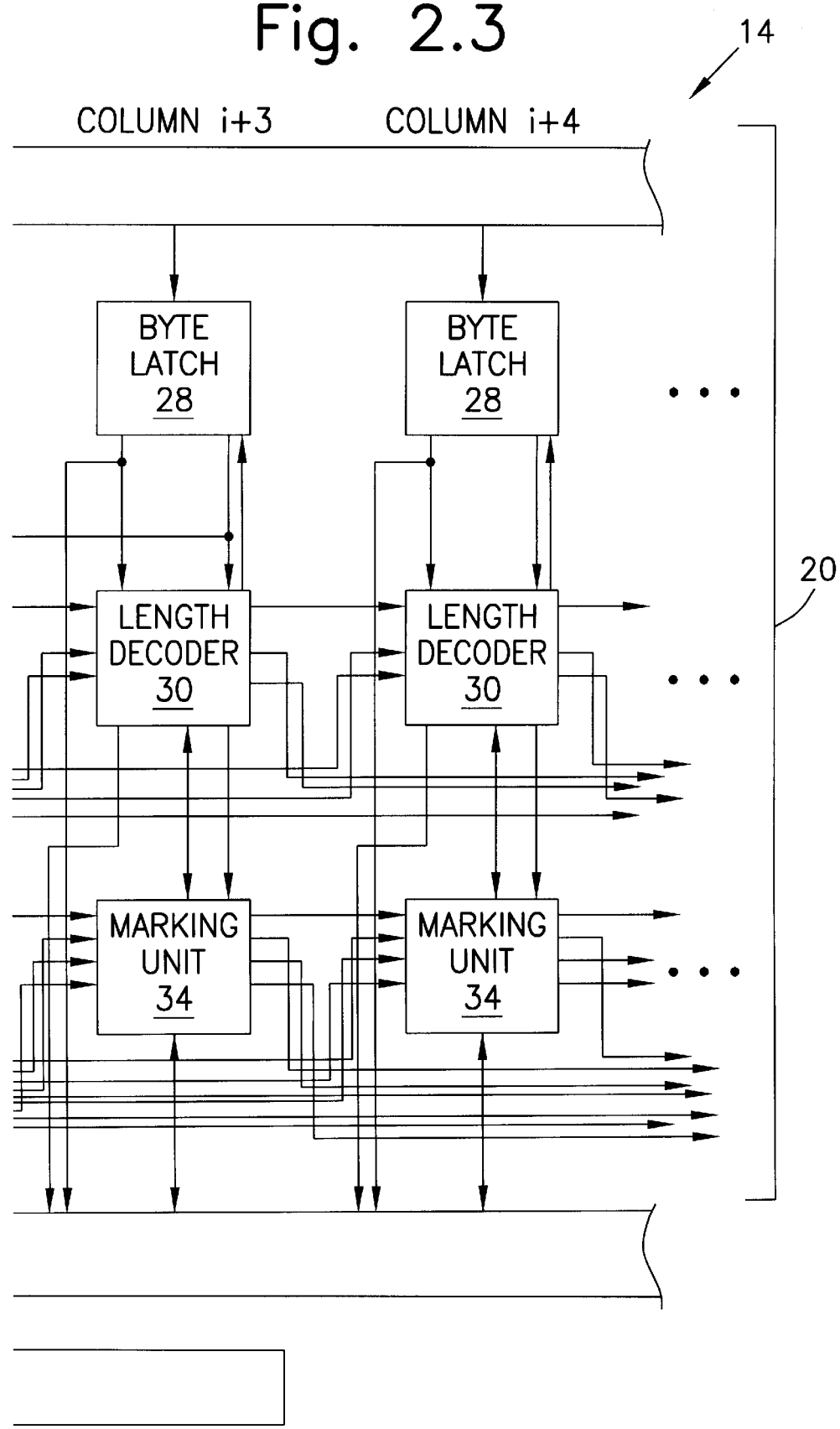
Fig. 2.3

Fig. 3.1
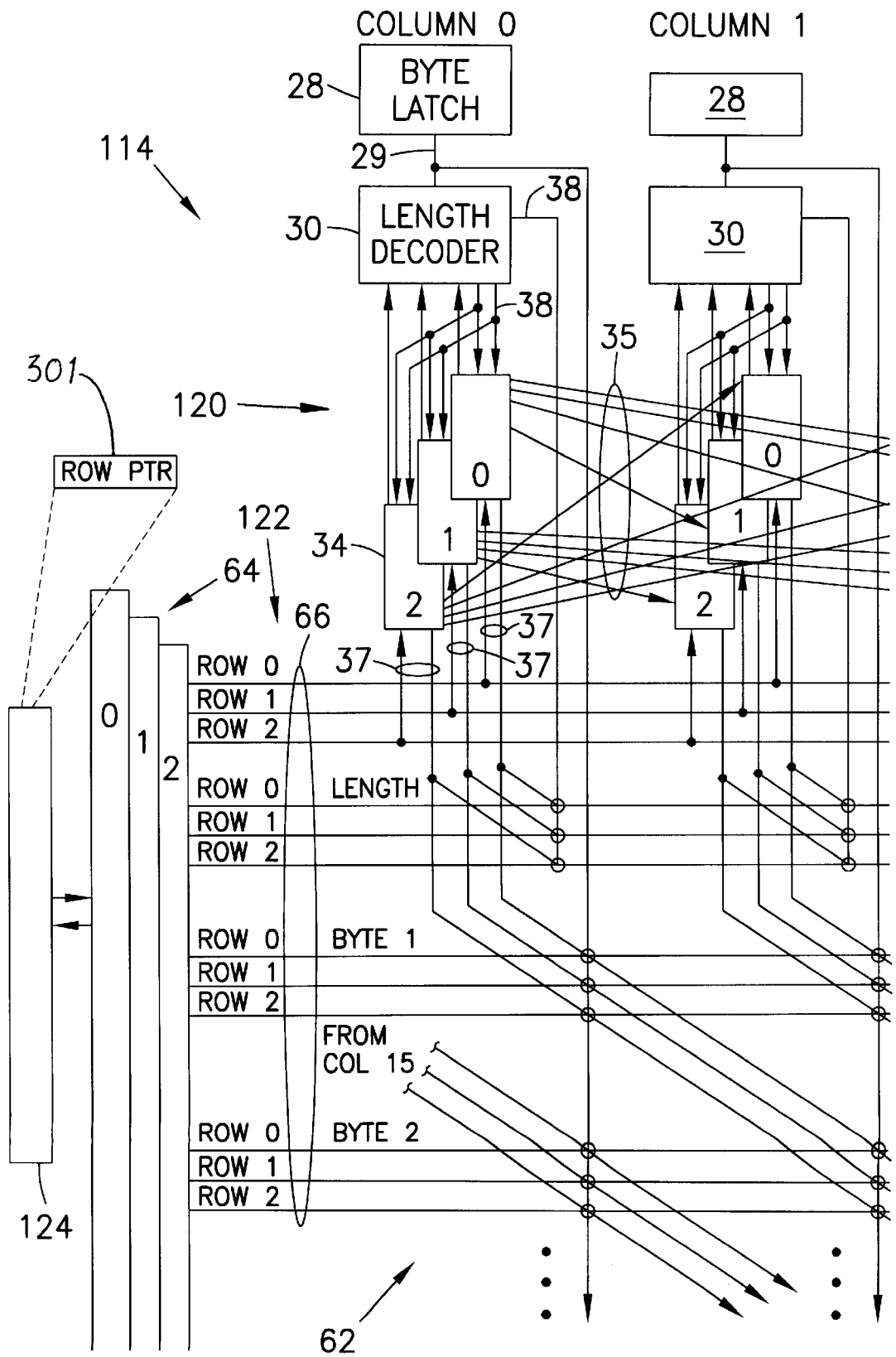

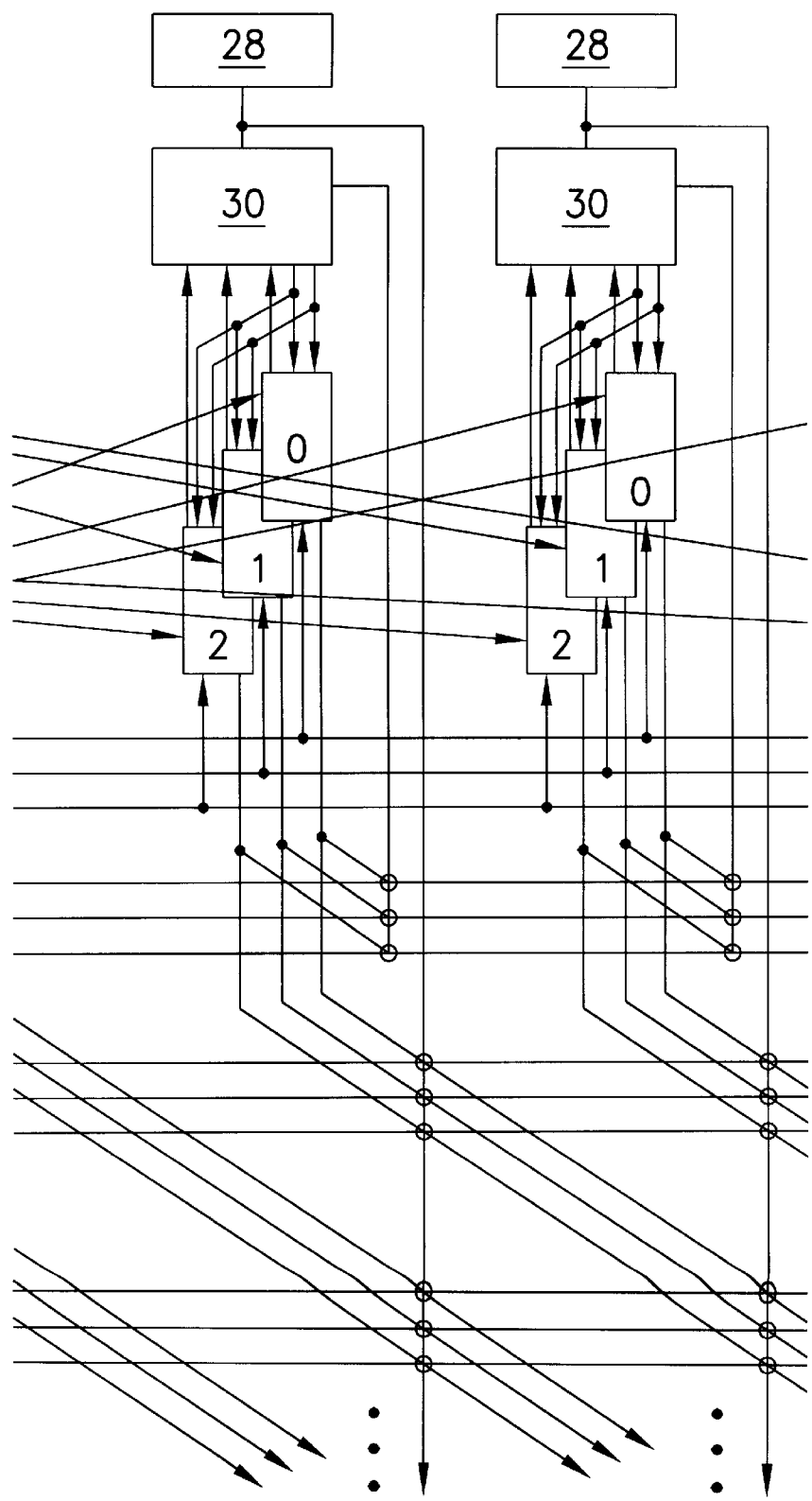
Fig. 3.2

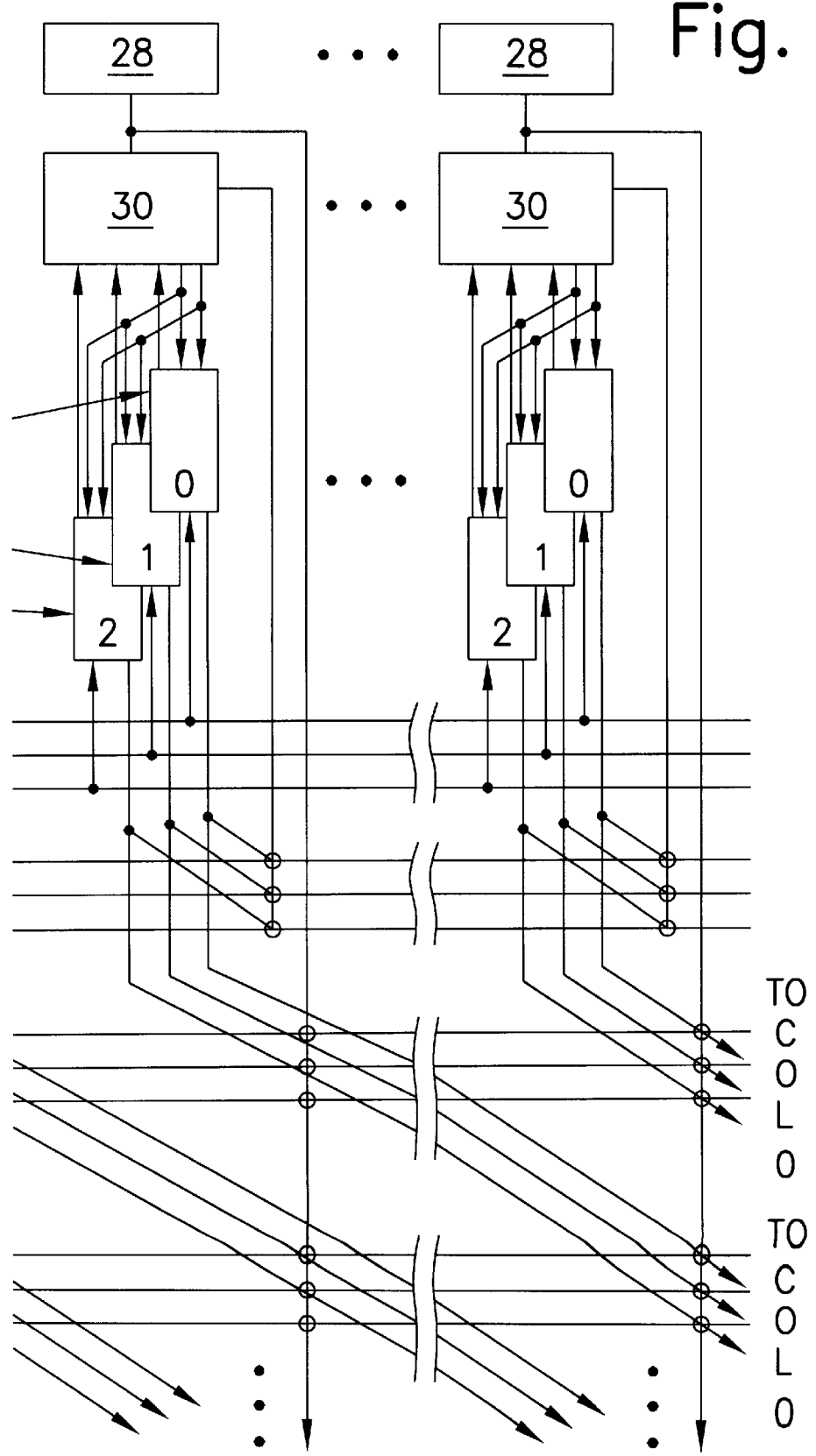
Fig. 3.3

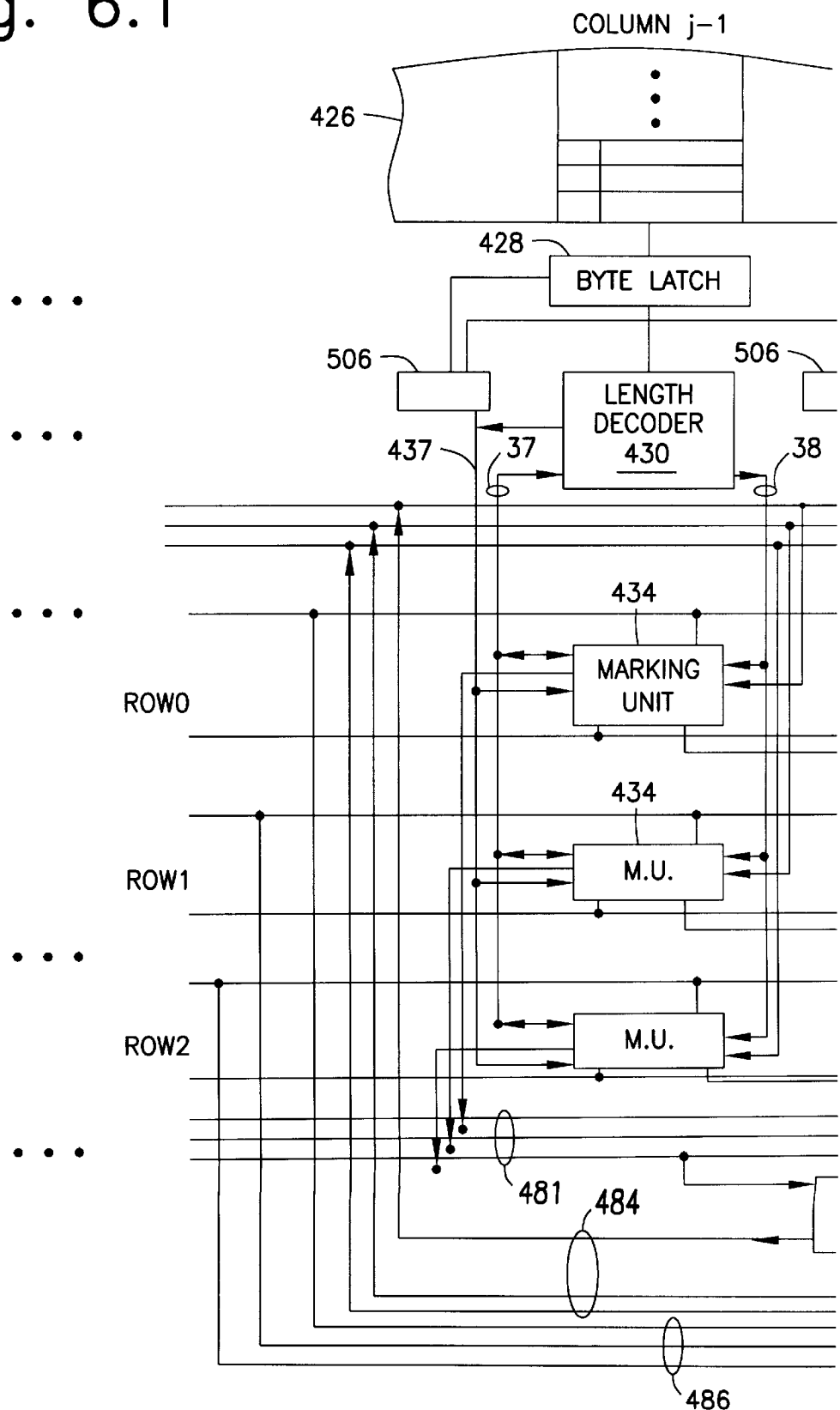
Fig. 6.1

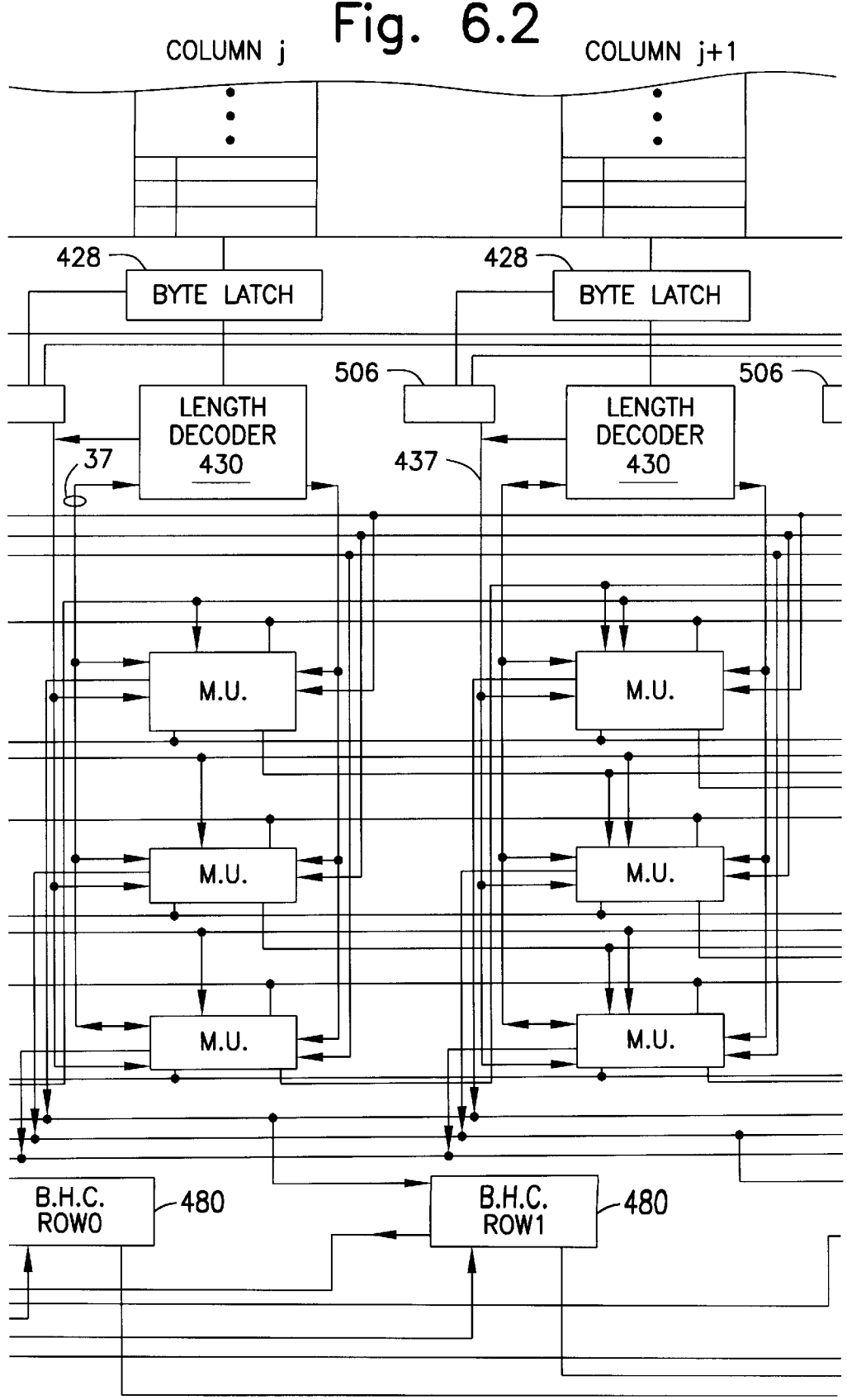

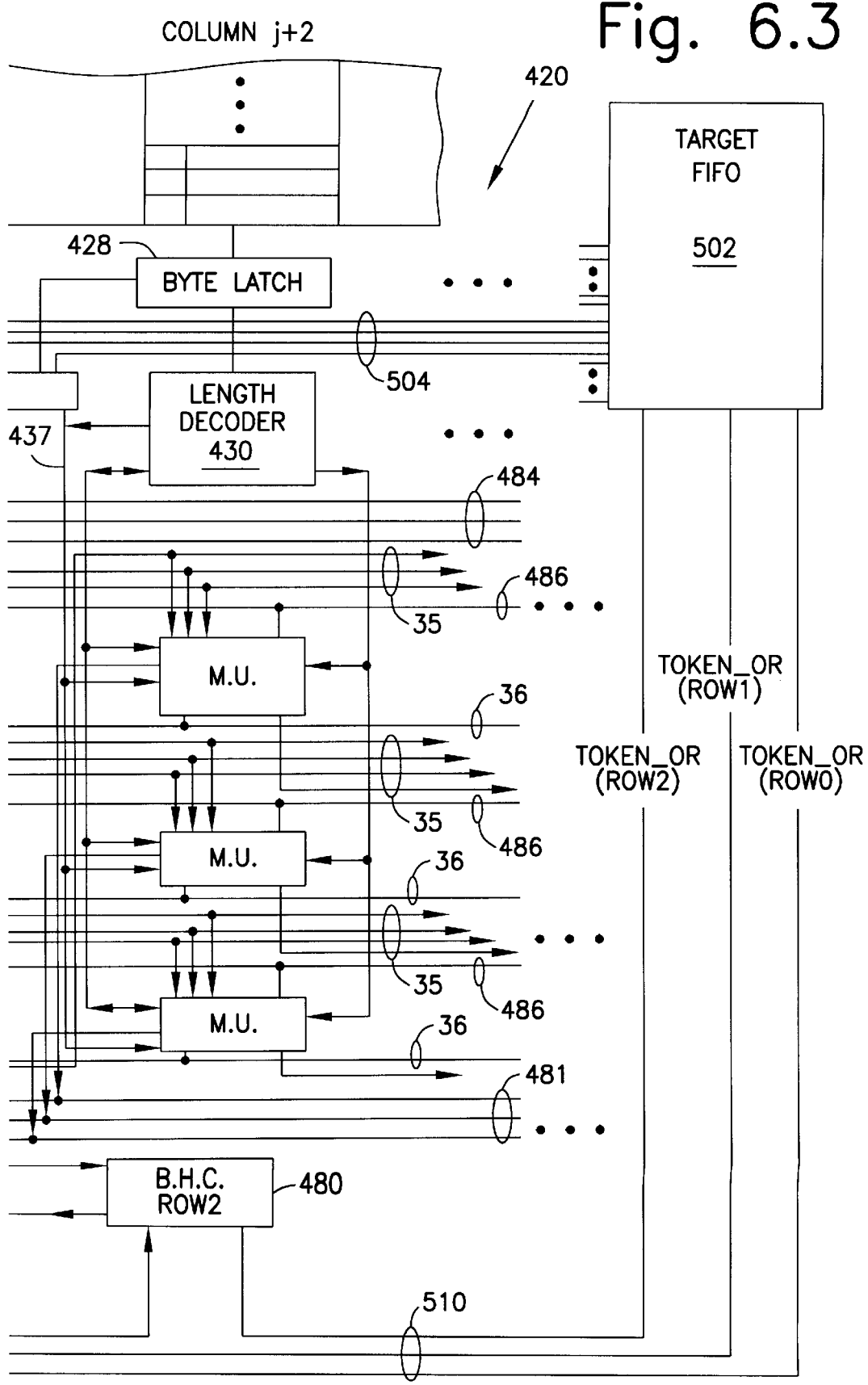
Fig. 6.3

BRANCH HANDLING CIRCUIT
Inject, Token, and TokenOR signals

BRANCH INSTRUCTION HANDLING IN A SELF-TIMED MARKING SYSTEM

FIELD OF THE INVENTION

The present invention is directed to a computer system executing variable length instructions. More particularly, the present invention provides an instruction decoding circuit having a self-timed length decoding, marking, and steering system, and capable of self-timed processing of branch instructions.

BACKGROUND OF THE INVENTION

Computer systems are capable of executing various arithmetic and logic operations on data. The particular arithmetic or logic operation to be executed is indicated by an "instruction" that is typically retrieved from a memory of the computer system, decoded in an instruction decode block, and then transmitted to an execution block of the computer for execution. Computer programs comprise a set of instructions that, when taken from memory, decoded and transmitted to the execution block in a certain sequence, cause the computer system to execute a series of operations that achieve the objective of the program.

There are computer systems designed to implement a variable length instruction architecture, wherein instructions can vary in length from, for example, one byte to eleven bytes or more. However, memory systems, and in particular the cache memory used to store instructions prior to execution, typically store data in fixed sized blocks such as, for example, sixteen byte blocks. In such a system, instruction data is fetched in sixteen byte lines aligned on sixteen byte boundaries. Accordingly, in a variable length instruction architecture, each fixed sized line fetched from memory contains instructions of various lengths that may start anywhere within the line and may even cross a line boundary into a succeeding line of memory.

An instruction marking circuit is typically implemented in the instruction decode block of a computer having a variable length instruction architecture in order to mark the beginning of each instruction in a line fetched from a fixed sized line memory system. The instruction marking circuit includes length decoders, which process a selected byte or number of bytes of the fetched line to determine a length for the instruction containing the bytes. Once instruction lengths are determined and first instruction bytes are marked, the instructions of the fetched line can be transmitted to an instruction decoding circuit within the decode block.

Instruction marking is, by nature, a serial operation, since the beginning of a particular instruction can be determined with certainty only after the beginning and length of a previous instruction have been determined. In present instruction marking circuits, the serial nature of instruction marking is accommodated by performing the marking operation according to an externally-timed scheme that controls and synchronizes circuit operations by a system clock. Marking information is propagated through the marking circuit in synchronization with the system clock. The length decoders that are typically used in marking circuits, however, comprise combinational logic circuits that perform length decodes in varying amounts of time depending upon the particular instruction being processed. To assure that all possible instructions found in an instruction line fetched from memory will be marked, the timing of the clock signals must be sufficient to process a "worst case" decode time for an instruction. That is, the timing must be sufficient to permit signals to traverse the longest path through the combinational logic of the length decoder, thus delaying the propagation of marking signals through the marking circuit when the instruction is not a "worst case" instruction.

Only a limited subset of instructions are of the "worst case" instruction type. Thus the time required for processing this relatively small subset of instructions is imposed on all marking operations such that the overall time needed for instruction marking is longer than actually required in most instances. As a result, the known scheme for marking instructions in a variable length instruction architecture incurs wasteful delay in the instruction execution process, decreasing system performance.

The U.S. patent application Ser. No. 08/997,457, entitled "Parallel Processing and Self-Timed Serial Marking of Variable Length Instructions" (filed on even date herewith), provides for fast and efficient instruction decoding through the self-timed length decoding, marking, and steering of instructions. An exemplary embodiment of a computer system according to the teachings of the aforementioned application is shown in FIG. 1 (and described in more detail by the aforementioned application). As shown in FIG. 1, an instruction fetch, decode, and execute pipeline 1 is implemented in a computer system. An instruction cache 10 is a memory used to store a set of instructions that are most likely required by the computer for execution in the near future, in accordance with known caching techniques. The instructions are stored in and fetched from the instruction cache 10 in instruction lines, each comprising a fixed sized block of bytes, for example, sixteen bytes. Each instruction line stored in the instruction cache 10 is aligned within the memory along a sixteen byte boundary. Each instruction contained in a line can vary in length from one byte to the maximum byte length used in the computer system, and any particular line of instructions can contain instructions of any combination of byte lengths.

An instruction fetch block 12 operates to fetch a line of instructions for input to an instruction decode block 14. The instruction decode block 14 decodes the instructions within the line fetched from the instruction cache 10 for input to an execution block 16 for execution, as is generally known. An instruction issue block 18 can be implemented to receive decoded instructions from the instruction decode block 14 for transfer to the execution block 16.

As noted above, the instructions stored in the instruction cache 10 can vary in length and instructions of any combination of lengths can be found in any particular instruction line fetched from the instruction cache 10. Accordingly, the instruction decode block 14 includes an instruction marking circuit 20 that operates to mark the first byte of each instruction contained in a fetched line. Once marked, the instructions are transferred, for example, to an instruction steering circuit 22 to await transfer to an instruction decode circuit 24. The instruction decode circuit 24 decodes the instructions and outputs decoded instructions to the instruction issue block 18.

FIG. 2 shows an exemplary embodiment of an instruction decode block 14 using the self-timed techniques of the aforementioned application. Instruction lines fetched from the instruction cache 10 by instruction fetch block 12 are received by an instruction line buffer 26 of the instruction marking circuit 20. Instruction line buffer 26 may be implemented as a FIFO, such that multiple instruction lines can be stored in anticipation of the marking process.

The instruction marking circuit 20 can be described for illustrative purposes as being arranged in "columns" corresponding to each byte position of the instruction line buffer 26. Thus, a column "contains" those functional units used to process a byte for the particular byte position in the instruction line. For an instruction line width of, for example, sixteen bytes, the instruction marking circuit 20 can be described as having sixteen columns, each containing the functional units used in byte processing. Those columns corresponding to the first byte positions of the instruction line buffer (i.e. lower memory addresses) are considered the "front" of the instruction marking circuit, while those columns corresponding to the last byte positions of the instruction line buffer (i.e. higher memory addresses) are considered the "end" of the instruction marking circuit. Relative to each other, columns associated with lower memory addresses are considered "upstream" columns, while columns associated with higher memory addresses are considered "downstream" columns.

Each byte of the instruction line is separately sent to a respective byte latch 28 in each column of the instruction marking circuit 20. The byte is processed by a length decoder 30 for that same column of the instruction marking circuit 20, together with any additional downstream bytes in byte latches 28 of downstream columns, as may be required by the length decoding algorithm used in the variable instruction length architecture. The combinational logic implemented in the length decoder 30 produces a signal indicating the computed length of the instruction, under the assumption that the byte being processed is the first byte of an instruction.

To indicate instruction length, each length decoder 30 has a number of length signal outputs. The length signal outputs are coupled to length signal output lines 38, which are further coupled to other functional units in the instruction marking circuit 20, as described below. The number of length signal outputs (and, therefore, length signal outputs lines 38) is dependent on the maximum possible instruction length and the encoding scheme used for length signals. For the example of FIG. 2, the maximum possible number of bytes in an instruction is four, and the length signals are implemented as "one-hot" signals, i.e., only one signal is provided as active for each byte length. As a result, each length decoder 30 shown in FIG. 2 has four length signal outputs, one for a one byte instruction, one for a two byte instruction, and so on. Each length decoder 30 asserts a "one-hot" signal on the length signal output line 38 corresponding to the length determined by the length decoder 30 for the current byte being processed in that column.

Since each length decoder 30 asserts the appropriate length signal as soon as it completes the length decode for the current byte, length information may be available much earlier than under the "worst-case" decode time.

A plurality of marking units 34 is also provided, one in each column of the instruction marking circuit 20. The instruction length output lines 38 coupled to each length decoder 30 are also coupled to the marking unit 34 for the same column. Each marking unit 34 is further coupled to a number of marking lines 35 used to carry marking signals to mark a subsequent byte as the first byte of the next instruction. The number of marking lines 35 corresponds to the maximum number of bytes possible in the variable length instruction architecture. Thus, as shown in FIG. 2 for a maximum instruction length of four bytes, each marking unit 34 is coupled to four marking lines 35, one corresponding to each byte length available in the variable length instruction architecture. Accordingly, each marking unit 34 is also coupled to four marking lines 35 carrying marking signals generated by four upstream marking units 34.

Based on the length signals provided by the length decoder 30, the marking unit 34 determines the column containing the first byte of the next instruction in the instruction line. The marking unit 34 indicates the first byte of the next instruction by directly signaling a subsequent marking unit 34 in a downstream column via a marking signal over the appropriate marking line 35. Marking may be achieved, for example, by sending a "one-hot" signal over the appropriate marking line 35 to a downstream marking unit 34. Each marking line 35 is coupled between the marking unit 34 of the present column and a marking unit 34 for a subsequent column: the marking line 35 used to signal a one byte length instruction is coupled to the marking unit 34 for the next column of the instruction marking circuit 20; the marking line 35 used to signal a two byte length instruction is coupled to the marking unit 34 two columns away, and so on. The marking unit 34 asserting a marking output thereby directly marks the first byte of the next instruction of the fetched line.

For those marking units 34 at the end of the instruction marking circuit 20, the marking lines 35 used to mark a column beyond the end of the instruction marking circuit 20 are "wrapped around" to the marking units 34 at the front of the instruction marking circuit 20. The marking information transmitted via the wrapped-around marking lines 35 therefore marks the first byte of the first instruction on the next fetched instruction line.

Activation of a marking output of a marking unit 34 is controlled by satisfaction of certain system conditions. For example, a marking unit 34 waits for an indication that its column contains the first byte of an instruction, as provided by the marking signal received over the marking lines 35 from upstream marking units 34. A marking unit 34 also waits for an indication that the bytes that comprise the instruction have been loaded into their respective byte latches 28 and are ready for transmission, for example, as provided by an INSTRUCTION_READY signal provided by length decoder 30 and carried by length decoder handshaking lines 37. A marking unit 34 also waits for an indication that the instruction steering circuit 22 is available to receive an instruction for decoding and execution, for example, as provided by a BUFFER_AVAILABLE signal produced by instruction steering circuit 22 and carried by output buffer handshaking lines 36. These signals can arrive in any order.

Once these conditions have been satisfied, the instruction bytes are transmitted from the byte latches 28 to the instruction decode circuit 24 over byte latch output lines 29 and via a crossbar switch and output buffer within the instruction steering circuit 22. Instruction length data is also transmitted from the length decoder to the instruction decode circuit 24 via the crossbar switch and output buffer. The byte latches 28 are then loaded with new bytes from the next instruction line in instruction line buffer 26. A marking signal is concurrently sent over a marking line 35 to the marking unit 34 in the downstream column containing the first byte of the next instruction. The marking unit 34 in that downstream column may then perform a similar marking and transfer operation.

As a result of the above, the generation and transmission of all instruction bytes and marking information flows through the length decoders 30 and marking units 34 in a self-timed manner, and at an average speed that is faster than clocked circuits. To further increase the throughput of the instruction length decoding and marking process, processing of the bytes in a next instruction line can begin as soon as the individual byte latches 28 processing previous instruction bytes become available. The wrap around marking information generated during a current instruction line remains available to mark the first byte of the first instruction in the next instruction line.

In a second exemplary embodiment of an instruction decode block 14 implementing self-timed instruction length decoding, marking, and steering, as described in the aforementioned patent application, multiple self-timed marking units 34 are employed to increase the throughput capabilities of the instruction decode block 114. FIG. 3 shows such an embodiment, wherein the instruction decode block 114 is implemented having sixteen columns and is capable of processing instructions up to 4 bytes in length. As shown in FIG. 3, instruction marking circuit 120 is implemented using multiple marking units 34 in each column, with each marking unit 34 of the column given a different "row" designation for descriptive purposes. Marking signals are propagated through the marking circuit by sending the marking signals to the marking unit 34 of the next higher row in the column to be marked. The number of rows to be implemented in an instruction marking circuit 20 can be determined based on a calculation of the speed of instruction marking in relation to the speed of the steering function. For the embodiment shown in FIG. 3, three rows (row 0, row 1, and row 2) are implemented in instruction marking circuit 120, although other quantities can be implemented.

The instruction steering circuit 122 is implemented to mirror the instruction marking circuit 120, such that instruction steering circuit 122 contains a crossbar switch 62 having a number of rows equal to the number of rows in the instruction marking circuit 120, and a number of output buffers 64 equal to the number of rows in the instruction marking circuit 120. Instruction bytes are transferred, via the row of the crossbar switch 62 that is the same row as the row of marking unit 34 that has processed those instruction bytes, the output buffer 64 of the same row designation as the row of the marking unit 34. Instructions are therefore incrementally spread across each output buffer, allowing the instruction decode circuit 124 to fetch instructions sequentially from each output buffer using, for example, a row pointer 301.

A more detailed description of the self-timed length decoding, marking, and steering of instructions may be found in the aforementioned patent application, which is expressly incorporated herein by reference.

As described above, modern computer systems are typically implemented with an instruction pipeline, where a "stream" of instruction bytes is directed through the functional elements of the pipeline. For example, referring to FIG. 1, instruction bytes are supplied to the instruction cache 10 of the instruction pipeline 1, which are then directed through each subsequent functional block of the instruction pipeline 1. A pipelined system architecture can increase the overall throughput of the computer system by performing instruction overhead functions in advance of the actual execution time of the instruction.

Branch instructions, however, pose a special problem in instruction pipelining, since branch instructions allow program execution to jump to another location in the program, possibly outside of the instruction stream of the pipeline. Without contingencies for branches, the instruction pipeline would need to be "flushed" of its contents and reloaded with a new instruction stream containing the target instruction whenever a branch occurred. In order to avoid the delays that would occur if the instruction pipeline were "flushed" on a taken branch, branch instructions are typically evaluated prior to or during processing in the instruction pipeline. The instruction stream can then be adjusted to contain the targeted instruction of the branch and those instructions following that targeted instruction. For example, in the typical computer system having a memory system that stores data in fixed-size lines, such as in FIG. 1, the instruction line containing the targeted instruction can be supplied to the instruction cache 10 immediately following the instruction line containing the branch instruction, thus avoiding a pipeline flush.

Some branch instructions, however, are "conditional branches"—branches that are taken only when certain conditions based on run-time data are satisfied (such as in a program loop). Thus conditional branches cannot be accurately evaluated while being processed in the instruction pipeline. In order to mitigate this problem, modern computer systems employ a branch prediction function that evaluates conditional branches based on various prior events. Based on the evaluation of the branch predictor, the instruction stream can be adjusted to include the instruction line containing the predicted target instruction. If the branch has been correctly predicted, processing of the instruction stream in the instruction pipeline can continue without delay. If the branch has not been correctly predicted, then the instruction pipeline is flushed and loaded with the appropriate instruction bytes.

Branch instructions present a special problem for a self-timed length decoding, marking, and steering system such as previously described. The system is expecting the next instruction to be found immediately following the presently marked instruction. Accordingly, the system will send a marking signal to the byte immediately following the last byte of the present instruction, regardless of whether a branch has been predicted. Thus, a branch instruction in a self-timed marking system may cause the pipeline to be flushed, incurring wasteful delay.

SUMMARY OF THE INVENTION

An exemplary embodiment of the present invention is implemented as an instruction marking circuit. The instruction marking circuit has a buffer of a certain byte width in order to receive and hold bytes of, for example, an instruction line. The buffer also can hold branch information associated with each byte. The instruction marking circuit also has a number of columns that correspond to the byte width of the buffer, where each column comprises a self-timed marking unit and branch handling logic. The self-timed marking unit is operatively coupled to the buffer in order to receive instruction length information at least partially derived from the byte in the buffer corresponding to that column. The branch handling logic is also operatively coupled to the buffer in order to receive the branch information associated with the byte. The branch handling logic uses the branch information to produce a branch marking signal to mark one of the columns as containing the target instruction when the byte being processed is part of a predicted branch instruction.

BRIEF DESCRIPTION OF THE DRAWINGS

FIG. 2 shows a block diagram of a first exemplary self-timed instruction decode block.

FIG. 3 shows a block diagram of a second exemplary self-timed instruction decode block, having multiple marking units.

FIG. 6 shows a block diagram of an exemplary embodiment of an instruction marking circuit and target FIFO according to the present invention.

DETAILED DESCRIPTION OF THE DRAWINGS

Figure 1:
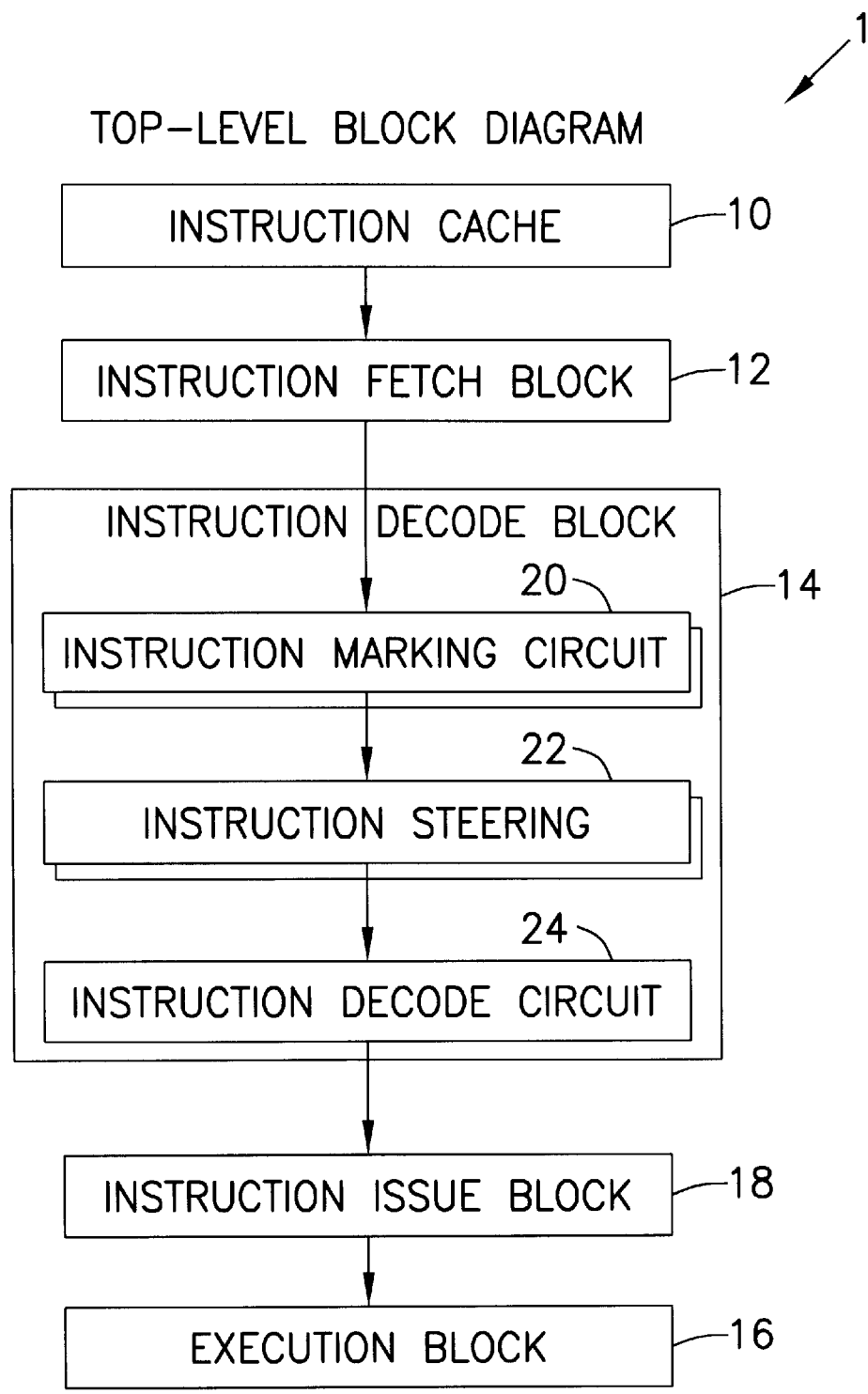
FIG. 1 shows a block diagram of an exemplary instruction execution pipeline.
Figure 4:
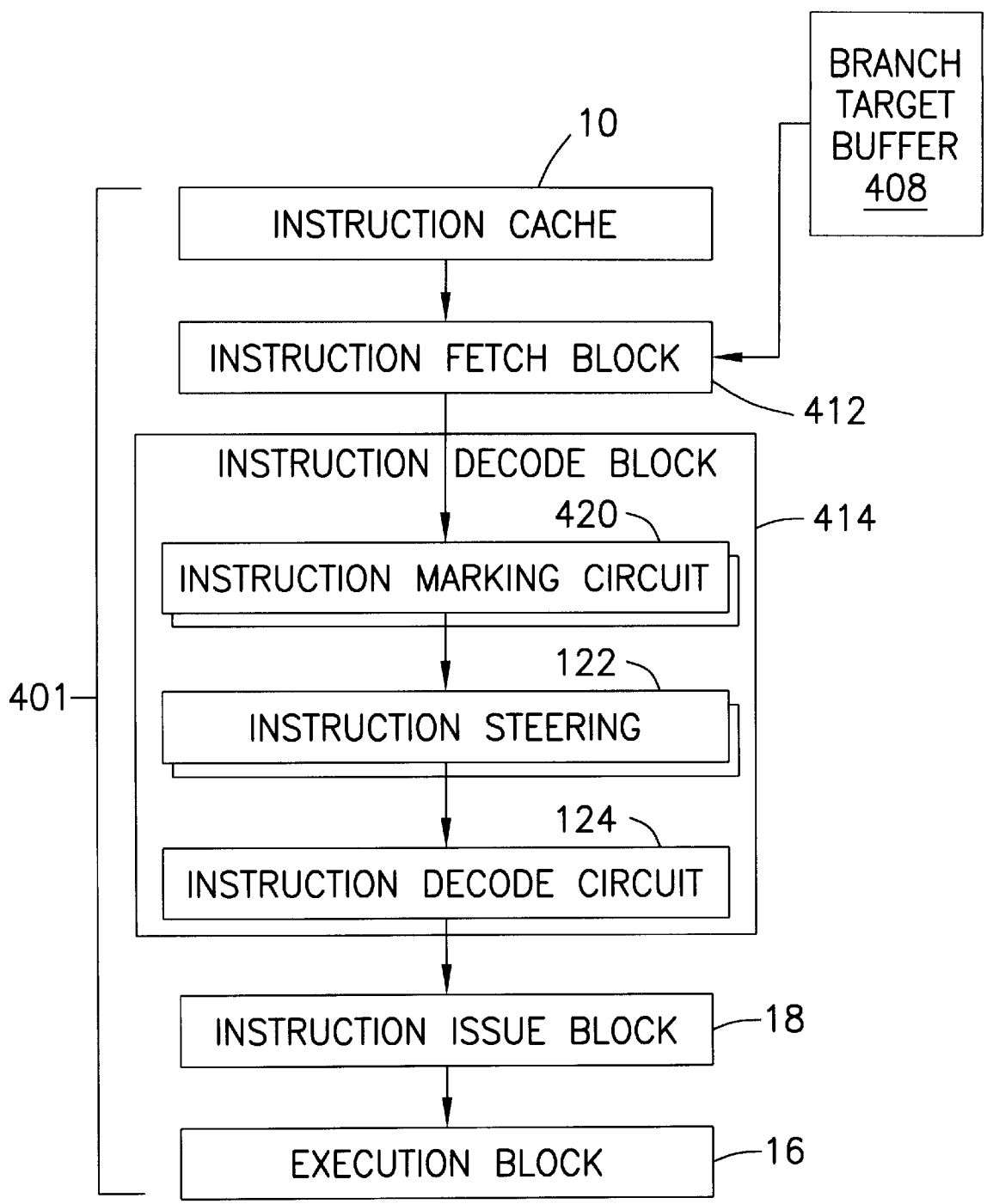
FIG. 4 shows a block diagram of an exemplary instruction execution pipeline and branch target buffer, according to the present invention.

FIG. 4 shows a block diagram of an exemplary embodiment of an instruction execution pipeline according to the present invention. The exemplary embodiment is described with reference to a sixteen byte instruction line architecture, although the present invention is equally applicable to larger or smaller instruction line widths, as those in the art will recognize. The exemplary embodiment is also described with reference to a maximum instruction length of four, although the present invention is equally applicable to larger or smaller instruction sizes.

As shown by FIG. 4, an instruction execution pipeline 401 includes an instruction cache 10. Instruction cache 10 is implemented, in accordance with known caching techniques, to store a stream of instruction lines fetched from another storage medium (for example, memory or disk storage) for execution by the computer system. According to the exemplary embodiment, instruction cache 10 is designed to store instruction lines of sixteen bytes.

An instruction fetch block 412 operates to fetch a line of instructions from instruction cache 10 for input to an instruction decode block 414. The instruction decode block 414 includes an instruction marking circuit 420 for length decoding and marking of the instructions within the instruction line. Instruction decode block 414 also includes an instruction steering circuit 122 and instruction decoding circuit 124, which are implemented in a manner similar to that for the previously described self-timed instruction length decoding, marking, and steering system. Instructions processed by the instruction decode block 414 are sent to an execution block 16 for execution, as is generally known. An instruction issue block 18 can also be implemented to receive decoded instructions from the instruction decode block 414 for transfer to the execution block 16.

Instruction execution pipeline 401 is implemented in conjunction with branch target buffer 408, which is operatively coupled to the instruction fetch block 412. Branch target buffer 408, as part of a commonly implemented branch prediction system, contains information on where predicted branch instructions are located in an instruction line, as well as where predicted target instructions are located in an instruction line. When a branch has been predicted for a branch instruction in a particular instruction line, branch target buffer 408 marks the branch instruction as a taken branch, and marks the predicted target of the branch as a branch target instruction. A specific implementation of this action is described below.

Figure 5:
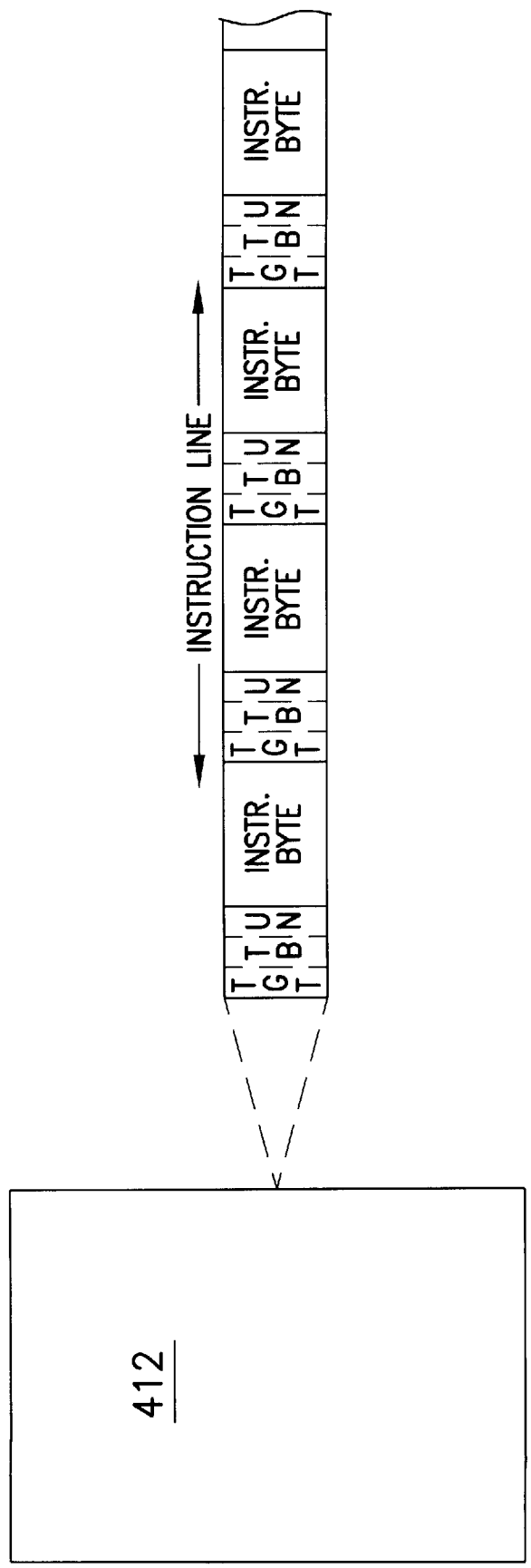
FIG. 5 shows a format of an exemplary instruction line according to the present invention.

Instruction fetch block 412 is implemented to accommodate the branch prediction system by including a set of branch flag bits appended to each byte position in the instruction line. As shown by FIG. 5, each byte of each instruction line processed by instruction fetch block 412 includes, for example, three branch flag bits: a Taken Branch (TB) flag, a Target (TGT) flag, and an Unused (UN) flag. When the branch target buffer 408 contains information that a branch instruction in an instruction line will likely be taken, the first byte of the predicted branch instruction is marked as such by setting its TB flag. Those bytes following the last byte of the predicted branch instruction, up to the end of the instruction line, are marked as "unused" by setting the UN flag, indicating that they should not be processed. Accordingly, the first byte of the target instruction of the predicted branch is marked as such by setting its TGT flag. Those bytes preceding the first byte of the target instruction, up to the beginning of the instruction line, are marked as "unused" by setting the UN flag, indicating that they should not be processed. In this exemplary embodiment, the TB, TGT, and UN flags are mutually exclusive for each byte of the instruction line; only one of these flags (if any) may be set for any byte of an instruction line.

Typically, the branch fetching process will cause the instruction line containing the target instruction to be fetched by instruction fetch block 412 immediately following the instruction line containing the branch instruction, regardless of where the target instruction is located. If, however, the target instruction is located in the same instruction line as the predicted branch instruction, then that instruction line will be repeated as the next instruction line.

FIG. 6 shows a portion of an exemplary embodiment of an instruction marking circuit 420 within instruction decode block 414. Instruction marking circuit 420 is implemented using the multiple marking unit configuration described previously, with modifications to implement an embodiment of the present invention, as discussed below. Only columns j−1, j, j+1, and j+2 of instruction marking circuit 420 are shown, however, all additional columns may be implemented in a manner similar to that shown for these representative columns. Also, for reasons of clarity, only those connections needed to explain the operation of the exemplary embodiment have been shown in FIG. 6. According to the exemplary embodiment of the instruction execution pipeline, the exemplary embodiment of instruction marking unit 420 is implemented for an instruction line having sixteen bytes and a maximum instruction length of four. The instruction marking circuit 420 may equivalently be implemented using the single marking unit configuration of a self-timed instruction marking circuit (See FIG. 2).

Instruction lines are sent to instruction line buffer 426, which has been designed to accommodate branch flag bits for each instruction byte. Each instruction byte and its associated branch flag bits are latched into a byte latch 428 for a column of the instruction marking circuit 420, according to the operation of the self-timed length decoding and marking system. Byte latches 428 are likewise implemented to accommodate the branch flag bits appended to each byte.

Byte latches 428 further include outputs to indicate the settings of the branch flag bits. For example, each byte latch 428 includes a taken branch output and a target output to indicate the status of the TB and the TGT bits, respectively. These outputs are coupled to branch indicator lines 437, which include, for example, a TB line and a TGT line. As described more fully below, the target output is used to indicate that the column contains the first byte of a target instruction, while the taken branch output is used to indicate that the column contains the first byte of a branch instruction.

If the UN flag bit is set for the byte in byte latch 428, the byte latch 428 will not assert a ready signal, but rather will be reloaded with a byte from the next instruction line in the instruction line buffer 426, according to the FIFO implementation of instruction line buffer 426.

In all other cases, the contents of each byte latch 428 are received by those length decoders 430 that are coupled to particular byte latches 428, according to the normal operation of the self-timed length decoding and marking system. The branch flag bits in the byte latch 428 of the column are also provided to length decoder 430. Where no branch flag bits have been set, length decoding in the length decoder 430 is performed according to the normal self-timed length decoding process, producing, for example, a "one-hot" length signal output over length signal lines 38 indicating the length of the instruction. Where the TGT flag bit has been set, normal length decoding is likewise performed by the length decoder 430. However, when the TB flag of an instruction byte has been set, the "one-hot" length signal outputs of length decoder 430 are inhibited to allow branch handling to occur.

Similar to the previously described self-timed multiple marking unit configuration (see FIG. 3), the marking units 434 of instruction marking circuit 420 are arranged in "rows" such that each column contains a number of marking units 434 each having a different row designation. In the exemplary embodiment of the instruction marking circuit 420 shown in FIG. 6, each column of instruction marking circuit 420 contains three marking units 434, designated as being in rows 0, 1 and 2 of the instruction marking circuit 420. The number of rows implemented can be higher or lower as desired without deviating from the principles herein described, as those in the art will recognize.

Each marking unit 434 within a column is coupled to the length decoder 430 for the same column via the length output lines 38 and the length decoder handshaking lines 37. Each marking unit 434 is further coupled to the byte latch 428 of the same column via branch indicator lines 437, which include, for example, a TB line (for the taken branch signal) and a TGT line (for the target signal).

Each marking unit 434 is further coupled to the subsequent and previous marking units 434 via marking lines 35, according to the previously described self-timed multiple marking unit configuration of the length decoding and marking system (see FIG. 3). Marking lines 35 are implemented to connect the marking unit 434 of a particular row of a column to marking units 434 of the next higher row in downstream columns. For example, as shown in FIG. 6, the marking unit 434 of row 0 column j is coupled via marking lines 35 to the marking units 434 of row 1 in columns j+1, j+2, j+3 (not shown) and j+4 (not shown). Each marking unit 434 within each column of instruction marking circuit 420 is further coupled to an associated row of instruction steering circuit 122 via output buffer handshaking lines 36, according to the previously described multiple marking unit configuration of the self-timed length decoding, marking, and steering system (see FIG. 3).

To implement branch instruction handling in the instruction marking circuit 420, a number of token-out lines 481 and a number of token-in lines 486 are provided. Each token-out line 481 is coupled between a marking unit 434 in a particular row and a branch handling circuit 480 (described below) for the subsequent row, while each token-in line 486 is coupled between a marking unit 434 in a particular row and the branch handling circuit 480 for the same row. Thus, as shown in FIG. 6, the token-out lines 481 originating with the marking units 434 of row 0 are coupled to the branch handling circuit 480 for row 1, the token-out lines 481 originating with the marking units 434 of row 1 are coupled to the branch handling circuit 480 for row 2, and the token-out lines 481 originating with the marking units 434 of row 2 are coupled to the branch handling circuit 480 for row 0.

The token-in lines 486 originating with marking units 434 of row 0 are coupled to the branch handling circuit 480 for row 0, and likewise for all other rows. As described further below, each token-out line 481 carries a TOKEN_OUT_x signal that indicates to the branch handling circuit 480 of the subsequent row that a branch instruction is pending, while each token-in line 486 carries a TOKEN_x signal that indicates to the branch handling circuit 480 that a column has been marked as the target of a predicted branch.

A number of inject lines 484 are also provided in instruction marking circuit 420. Each inject line 484 is coupled between the branch handling circuit 480 for a row, and all of the marking units 434 in that row. For example, as shown in FIG. 6, one inject line 484 connects the branch handling circuit 480 for row 0 with all marking units 434 in row 0. As is explained more fully below, each inject line 484 carries an inject signal to indicate that a target instruction byte should be expected in that row of the instruction marking circuit 420.

In operation, the branch handling scheme described above allows the exemplary embodiment of instruction marking circuit 420 to correctly and quickly process branch instructions. When a TB bit is present in a byte latch 428 of a column, this condition is transmitted via the TB line to each marking unit 434 in the column, indicating that the column contains the first byte of a predicted taken branch instruction. For example, length decoder 430 asserts a TB signal on the TB line, similar to the assertion of a length signal. Once a marking signal is received in the column (indicating that the byte is a first byte of an instruction), the marking unit 434 that is presently active generates a token output signal via token-out lines 481 to indicate that a branch is pending. The token output signal is received by the branch handling circuit 480 for the next higher row in the circuit, which then generates an inject signal via one of the inject lines 484 to indicate to the marking units 434 of this next higher row that a target instruction should be the next instruction to be marked.

When the marking units 434 of this next higher row receive the inject signal, the marking unit 434 that also receives a target signal over the TGT line (indicating the presence of the target instruction byte in the column) becomes marked as the first byte of the next instruction. Thus, according to the above processing, marking information is transmitted through the instruction marking circuit 420 to mark the target instruction.

Figure 7:
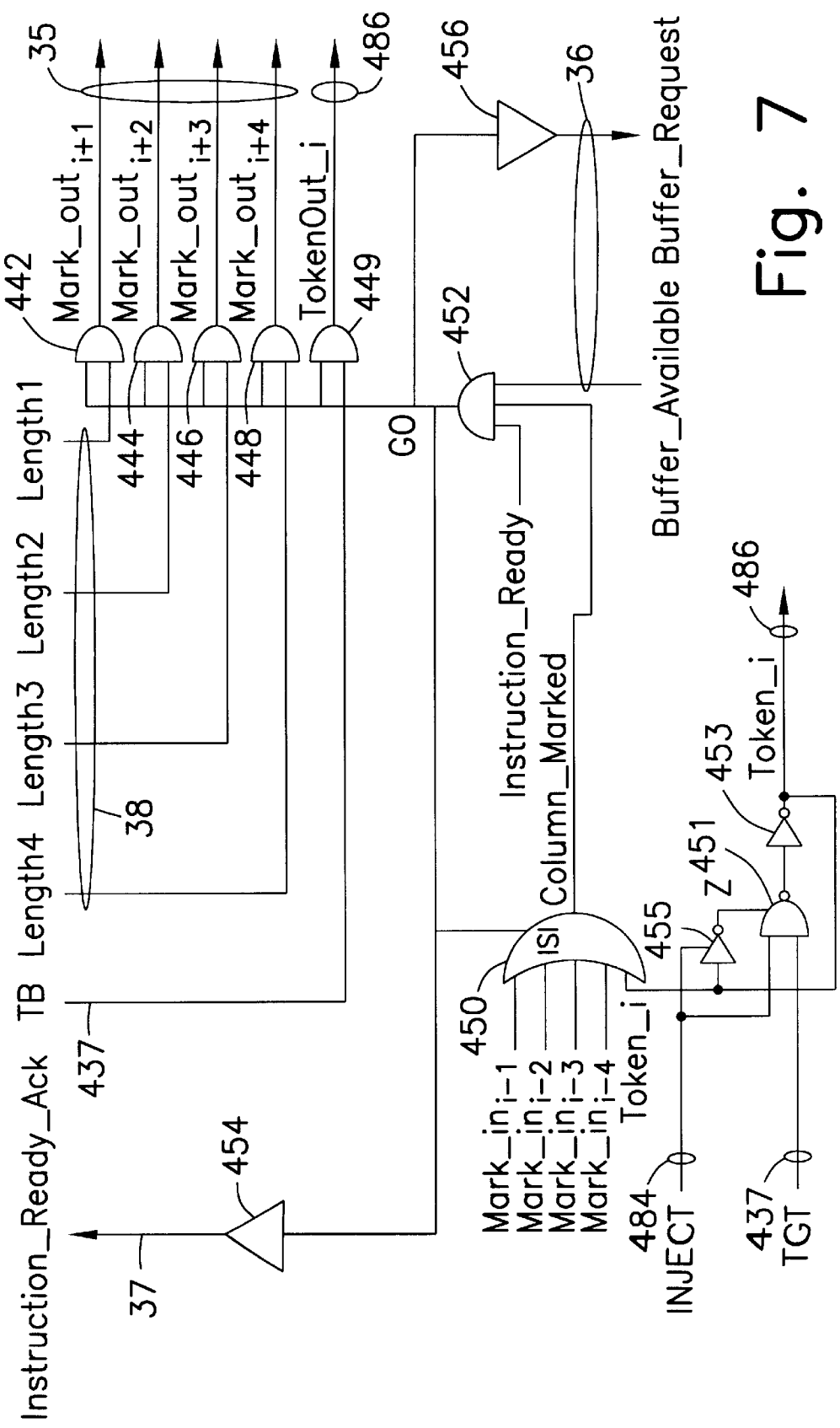
FIG. 7 shows a circuit logic diagram of an exemplary marking unit according to the present invention.

FIG. 7 shows a circuit logic diagram of an exemplary embodiment of a marking unit 434 used in implementing the branch handling system described above. LENGTH1, LENGTH2, LENGTH3 and LENGTH4 signals (carried by length output lines 38) are provided at a first input of a respective AND gate 442, 444, 446, and 448. As previously noted, the length decoder 430 signals the marking unit 434 via these length signal lines 38 to indicate the instruction length. The taken branch signal (carried by the TB line of branch indicator lines 437) is provided to a first input of a fifth AND gate 449, indicating that the present instruction is a predicted branch instruction. A second input of each AND gate is provided a GO signal, which acts as a switching control. The outputs of AND gates 442, 444, 446, and 448 are coupled to the marking lines 35, and produce the marking signals to mark the downstream columns of the circuit according to the normal self-timed marking process. The AND gate 449 is coupled to one of the token-out lines 481 and produces the signal TOKEN_OUT_i, used to indicate that a branch is pending.

When the GO signal is asserted (described below), the individual AND gate 442, 444, 446, 448, or 449 which also has its first input (LENGTH1, LENGTH2, LENGTH3, LENGTH4, or TB) asserted will assert a signal at its output. Thus, either a marking signal will be transmitted over one of the marking lines 35 to a downstream marking unit 434, or the TOKEN_OUT_i signal will be transmitted over one of the token-out lines 481 to the branch handling circuit 480 for the subsequent row.

An OR gate 450 receives as inputs a series of MARK_in signals (via marking line 35) that correspond to the marking signals produced by upstream marking units 434, indicating that the column contains the first byte of an instruction. OR gate 450 also receives as an input a TOKEN_i signal, which indicates that the column contains the first byte of a target instruction of a predicted branch. OR gate 450 produces a COLUMN_MARKED signal when any of the MARK_in signals or the TOKEN_i signal become active. OR gate 450 is configured to contain, for example, a state device at its output, such that its output remains asserted until reset by a reset signal applied at a reset terminal of OR gate 450.

As is the case for the normal self-timed marking unit 34 (see FIG. 2), the COLUMN_MARKED signal is connected as an input to AND gate 452, along with a BUFFER_AVAILABLE signal provided by the instruction steering circuit 122 (over output buffer handshaking lines 36) and an INSTRUCTION_READY signal provided by the length decoder 430 (over length decoder handshaking lines 37). The output of AND gate 452 is the GO signal, which is connected to the second inputs of AND gates 442, 444, 446, 448, and 449 (as described above), to drivers 454 and 456, and to the reset terminal of OR gate 450. The output of driver 454 is connected to an instruction ready acknowledge line of length decoder handshaking lines 37, and the output of driver 456 is connected to a buffer request line of output buffer handshaking lines 36.

Marking of the target instruction is accomplished by additional branch handling logic within each marking unit 434. For example, as shown in FIG. 7, each marking unit 434 includes NAND gate 451 which receives as inputs the INJECT signal from the branch handling circuit 480 for the same row as marking unit 434, and the target signal over the TGT line of the branch indicator lines 437. The output of NAND gate 451 is implemented as, for example, a state device, such that the output of NAND gate 451 is held until a reset signal is received at a reset terminal of NAND gate 451. The output of NAND gate 451 is connected to inverter 453, which produces a TOKEN_i signal as an output. The TOKEN_i signal is provided as the input to inverter 455, while the output of inverter 455 is provided to the reset terminal of NAND gate 451. This generates the pulse required at the input of the OR gate 450 (same as the MARK_in inputs, which are also pulsed). The output of inverter 455 is implemented as, for example, a state device, such that the output signal is held until a reset signal is received at a reset terminal of inverter 455. The reset terminal of inverter 455 is connected to the INJECT signal.

The circuitry of marking unit 434 is configured such that the TOKEN_i signal will only be asserted by the marking unit 434 of the correct row in the column containing the target of a predicted branch instruction. When both the INJECT signal (indicating the row that should process the target of the pending branch instruction) and the target signal (indicating the column contains the first byte of the target of the branch instruction) have been asserted, the TOKEN_i signal is then asserted at the output of inverter 453. When the TOKEN_i signal is asserted, the COLUMN_MARKED signal at the output of OR gate 450 becomes asserted, indicating that the column has been marked as containing the first byte of the next instruction to be executed. Thus, the TOKEN_i signals acts as a marking signal to mark the first byte of a target instruction.

Figure 8:
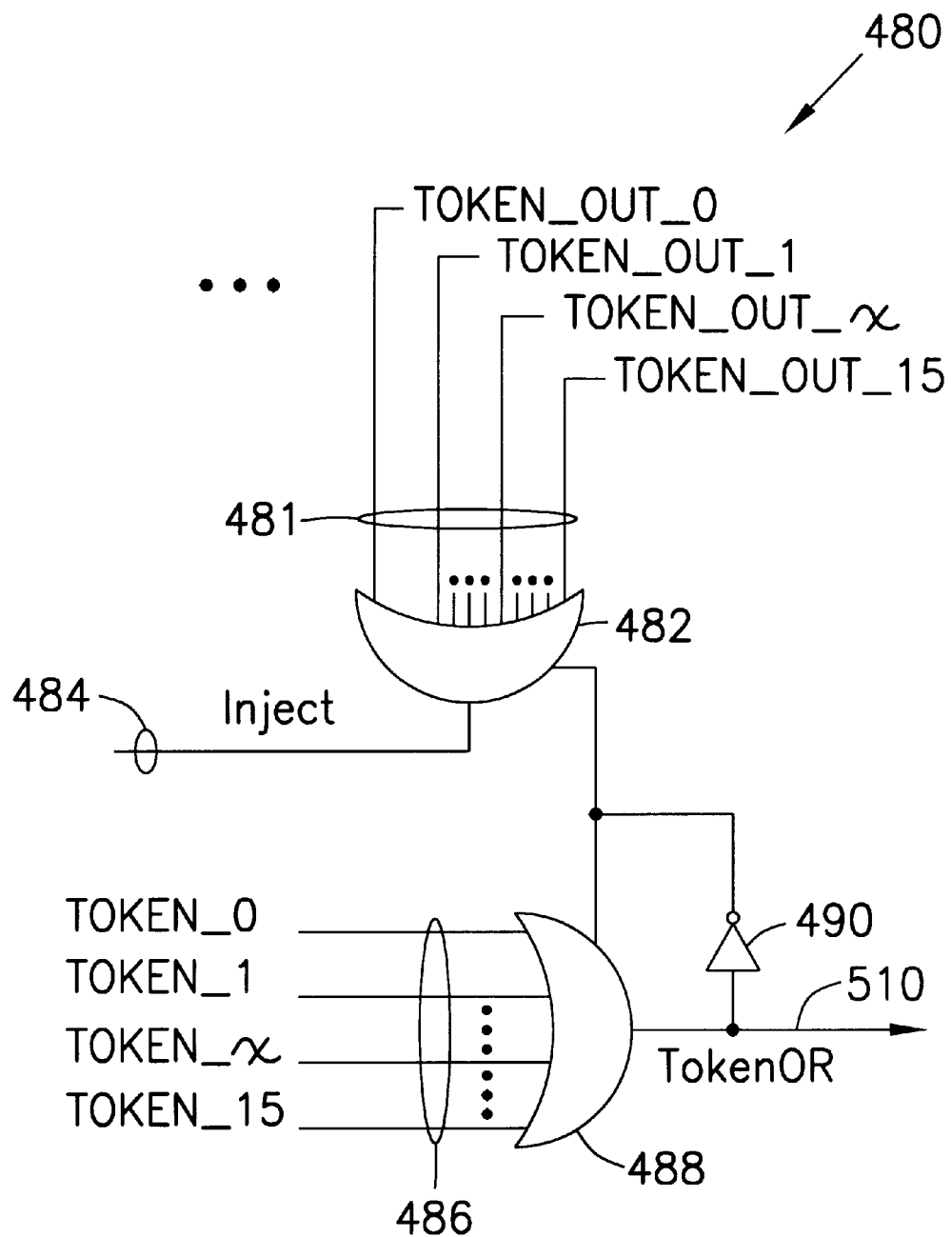
FIG. 8 shows a circuit logic diagram of an exemplary branch handling circuit according to the present invention.

The branch handling logic of instruction marking circuit 420 is also implemented, for example, using branch handling circuits 480, an exemplary embodiment of which is shown in FIG. 8. One branch handling circuit 480 is provided for each row in the instruction marking circuit 420. The TOKEN_OUT_x signals for a particular row of instruction marking circuit 420 (where "x" is the column designation of the marking unit 484 that generated the signal) are provided as inputs to OR gate 482 of the branch handling circuit 480 for the next higher row. Thus, for the exemplary embodiment having a sixteen byte instruction line width, sixteen TOKEN_OUT signals are provided (TOKEN_OUT_0 to TOKEN_OUT_15). When any of these signals are asserted, (indicating that a branch is pending) the output of OR gate 482—the INJECT signal—is asserted. The output of OR gate 482 is implemented as, for example, a state device, such that the INJECT signal is held asserted until a reset signal is provided at the reset terminal of OR gate 482. The INJECT signal is provided to every marking unit 434 of the row served by the branch handling circuit 480 over the inject line 484 for that row. The INJECT signal thereby indicates that a target instruction should be marked in that row as the next instruction. As described above, the INJECT signal is used by a marking unit 434 in conjunction with the target signal to determine which column contains the first byte of the target instruction.

In order to reset the branch handling logic, the TOKEN_i signal generated by the marking unit 434 that is the target of the branch instruction is transmitted via one of the token-in lines 486 to the branch handling circuit 480 of the same row. As shown in FIG. 8, the TOKEN_x signals for a particular row (where "x" is the column designation of the marking unit 484 that generated the signal) are provided as inputs to OR gate 488 in the branch handling circuit 480 for that row (TOKEN_0 to TOKEN_15). OR gate 488 produces a TOKEN_OR signal as an output. The output of OR gate 488 is implemented as, for example, a state device, such that the TOKEN_OR signal is held asserted once any of the TOKEN_x signals have been asserted.

TOKEN_OR is provided as an input to inverter 490, and the output of inverter 490 is provided to the reset terminals of OR gates 482 and 488. Thus, when the TOKEN_OR signal is asserted, the INJECT signal is deasserted and the TOKEN_OR signal is deasserted. According to the logic shown in FIG. 7, deassertion of the INJECT signal causes the inverter 455 in all marking units 434 of the same row as the branch handling circuit 480 to be reset. The TOKEN_x signals generated by all marking units 434 in that row become deasserted, and thus the branch handling logic for that row is properly reset to process another instruction byte.

According to the operation of the exemplary embodiment of instruction marking circuit 420, it is possible that the byte latches 428 in the circuit could be loaded such that more than one instruction byte that has been flagged as the target of a predicted branch instruction. For example, since bytes which have been flagged as "unused" (e.g., by setting the UN bit) will be discarded by the byte latches 428 without further processing, bytes from subsequent instruction lines may occupy some byte latches 428 during the processing of a branch instruction. If one of these bytes happens to be the first byte of a target instruction for later branch instruction, multiple target signals will be present in instruction marking circuit 420, causing an error in the marking process.

To ensure marking of the proper target of the predicted branch instruction, additional logic may be provided. For example, FIG. 6 includes a Target FIFO 502 operatively coupled to instruction marking circuit 420 for implementing target identification logic. When an instruction byte is identified as the first byte of the target of a predicted branch instruction (by setting of the TB bit for that byte), an entry is made in Target FIFO 502 (for example, by instruction fetch block 412) identifying the byte position in the fetched line of the first byte of the target instruction. As other bytes become identified as first bytes of target instructions (for later branches), the byte positions for these target instructions are also entered into Target FIFO 502, such that Target FIFO 502 contains, in sequential order, the byte positions of each target instruction to be processed by the instruction execution pipeline.

Although the format of the entries of Target FIFO 502 can be implemented in various ways, an exemplary Target FIFO 502 uses a sixteen bit wide FIFO having a number of lines, such that each line corresponds to an instruction line, and each bit corresponds to a byte position in the instruction line. Using this configuration, the contents of the front line of the FIFO can be easily transmitted to the instruction marking circuit, as discussed further below.

Target FIFO 502 includes sixteen signal outputs, one output for each byte position of the instruction line (and of the instruction marking circuit). When an entry reaches the front of Target FIFO 502, the contents of each bit position are asserted at the signal outputs. For example, if the next target instruction is expected in column 4, the front entry in Target FIFO 502 will have bit 4 set (and all other bits cleared), and the output corresponding to bit 4 will be asserted. Each signal output is connected to a target FIFO line 504, which is provided to instruction marking circuit 520, as described below.

Figure 9:
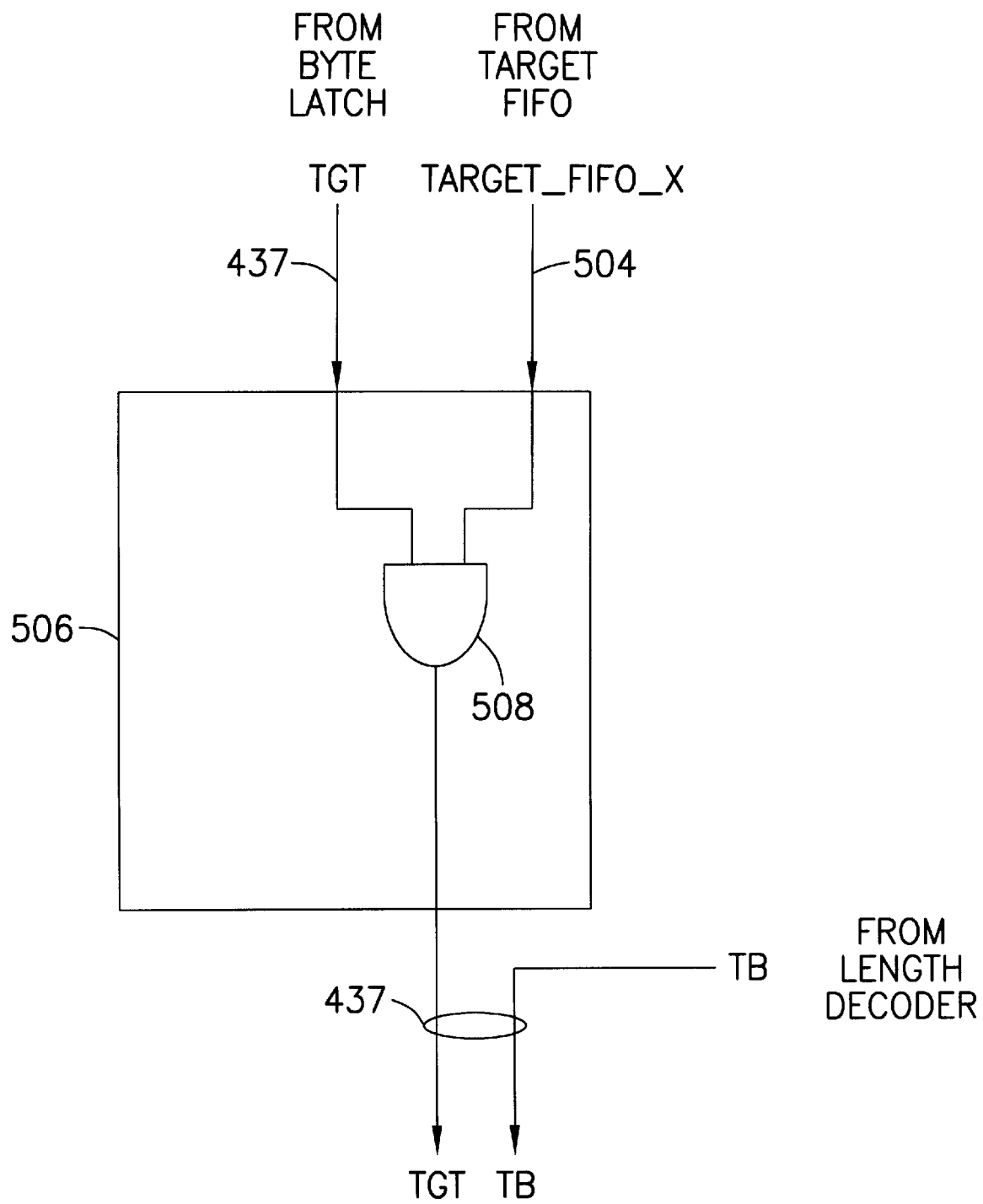
FIG. 9 shows a circuit block diagram of an exemplary target logic block as shown in FIG. 6.

Instruction marking circuit 420, as shown in FIG. 6, includes logic for processing the signals provided by Target FIFO 502. For example, a target logic block 506 is provided in each column of the circuit. Target logic block 506 is connected to the branch indicator lines 437 from the byte latch 428 of the same column, and is also connected to the Target FIFO line 504 for the column. For example, in column j, the target logic block 506 is connected to the branch indicator lines 437 from the byte latch 428 of column j and the Target FIFO line 504 for column j. Target logic block 506 is implemented so as to enable the assertion of the target signal over the TGT line for a column when the Target FIFO entry indicates that the column should contain the next target instruction. An exemplary target logic block 506 is shown in FIG. 9. The TGT line of branch indicator lines 437 is provided as an input to AND gate 508. The Target FIFO output corresponding to the column (denoted "TARGET_FIFO_x," where "x" is the column number) is also provided as an input to AND gate 508. The output of AND gate 508 is coupled to the TGT line (which is provided to the marking units 434 of the column). Accordingly, a signal on the TGT line from byte latch 428 will only be transmitted to the marking units 434 if the Target FIFO signal is also set, indicating that the column contains the next target instruction as entered in the Target FIFO.

Once a target instruction has been identified and marked using the TGT bit of the instruction byte and the entry in the Target FIFO, the Target FIFO must be incremented so that the next entry in the FIFO is the front entry. This is achieved by providing the Target FIFO 502 with the TOKEN_OR signals from each row of instruction marking circuit 420. Since the assertion of a TOKEN_OR signal in any row of the instruction marking circuit 420 indicates that a target instruction has been marked, the TOKEN_OR signals can be used to increment the pointer to the front entry in Target FIFO 502.

As shown in FIG. 6, TOKEN_OR lines 510 are coupled to Target FIFO 502 to provide the TOKEN_OR signals to Target FIFO 502. The TOKEN_OR signals are logically ORed within Target FIFO 502 (not shown), such if any of the TOKEN_OR signals becomes active, the pointer to the front entry of Target FIFO 502 can be incremented.

Although the present invention has been described with respect to specific exemplary embodiments, various changes and modifications may be suggested to one skilled in the art. For example, it may be contemplated to implement part or all of the present invention as hardware, microcode, programmable logic, and/or software. The present invention is intended to encompass these and other changes and modifications as fall within the scope of the appended claims.

What is claimed is:

1. An instruction marking circuit, comprising:
   a buffer having a plurality of byte locations to receive a plurality of bytes having branch information; and
   a plurality of columns corresponding to each of the plurality of byte locations, wherein each of the plurality of columns includes a self-timed marking unit operatively coupled to the buffer to receive instruction length information at least partially based on a corresponding byte of the plurality of bytes, and branch handling logic operatively coupled to the buffer and to the self-timed marking unit to receive the branch information of the corresponding byte;
   wherein the branch handling logic produces a branch marking signal to mark one of the plurality of columns as containing a target instruction of an expected branch instruction, based on the branch information of the corresponding byte.

2. The instruction marking circuit of claim 1, wherein each of the plurality of columns has exactly one self-timed marking unit.

3. The instruction marking circuit of claim 1, further comprising:
   at least one branch handling circuit coupled to the branch handling logic of each column;
   wherein the branch marking signal comprises a token signal provided to the branch handling circuit when the branch information of a first corresponding byte of the plurality of bytes indicates a taken branch, an inject signal provided to each of the branch handling logic when the token signal is received, and a branch mark signal produced when the inject signal is received an when the branch information of a second corresponding byte of the plurality of bytes indicates a target instruction.

4. The instruction marking circuit of claim 1, wherein the branch handling logic of each column is implemented in the self-timed marking unit of each column.

5. The instruction marking circuit of claim 1, wherein each column includes a length decoder operatively coupled to the buffer to receive the corresponding one of the plurality of bytes, and coupled to the self-timed marking unit to provide the instruction length information.

6. The instruction marking circuit of claim 5, further comprising a byte latch in each of the plurality of columns operatively coupled to the buffer to receive the corresponding byte, and coupled to the length decoder to provide the corresponding byte.

7. The instruction marking circuit of claim 1, wherein the branch information comprises branch flag bits.

8. The instruction marking circuit of claim 7, wherein the branch flag bits indicate one of a taken branch, a target instruction, and an unused byte.

9. The instruction marking circuit of claim 8, wherein the branch handling logic produces a branch marking signal when the branching information indicates a taken branch.

10. The instruction marking circuit of claim 9, wherein each column becomes marked when a branch marking signal is received and the branch information of the corresponding byte indicates that the corresponding byte is part of a target instruction.

11. The instruction marking circuit of claim 1, wherein each of the plurality of columns includes a first self-timed marking unit and a second self-timed marking unit.

12. The instruction marking circuit of claim 11, wherein each of the plurality of columns includes a self-timed length decoder operatively coupled to the buffer to receive the corresponding byte, and coupled to the first self-timed marking unit and the second self-timed marking unit to provide the instruction length information; and wherein the first self-timed marking unit has a first output coupled to the second self-timed marking unit of a first downstream column to provide a first marking signal and a second output coupled to the second self-timed marking unit of a second downstream column to provide a second marking signal.

13. The instruction marking circuit of claim 1, wherein the buffer and the plurality of columns are implemented in a microprocessor.

14. The instruction marking circuit of claim 1, further comprising a target FIFO buffer operatively coupled to each self-timed marking unit to provide branch target information.

15. The instruction marking circuit of claim 14, wherein each column includes target circuitry coupled to the target FIFO buffer to receive the branch target information, operatively coupled to the buffer to receive the branch information of the corresponding byte, and coupled to the self-timed marking unit to provide a target signal based on the branch target information and branching information; and wherein each column becomes marked when the target signal and the branch marking signal are received.

16. A computer system, comprising:
    a branch predictor; and
    an instruction execution system, comprising
        an instruction cache,
        an instruction fetch block, and
        an instruction marking circuit having a buffer with a number of byte locations, and
        a number of columns corresponding to each byte location of the buffer, wherein each of the number of columns includes at least one self-timed marking unit and branch handling logic;
    wherein the instruction cache is operatively coupled to the instruction fetch block to provide instruction bytes, the branch predictor is operatively coupled to the instruction fetch block to provide branch information, the instruction fetch block is operatively coupled to the instruction marking circuit to provide the instruction bytes and the branch information to the buffer, each of the at least one self-timed marking units is operatively coupled to the buffer to receive instruction length information at least partially based on a corresponding byte of the instruction bytes, the branch handling logic is operatively coupled to the buffer to receive the branch information of the corresponding byte and produce a branch marking signal based on the branch information.

17. The computer system of claim 16, further comprising an instruction steering circuit operatively coupled to the instruction marking circuit, wherein the instruction steering circuit comprises a plurality of crossbar switches, including a first crossbar switch and a second crossbar switch, and a plurality of output buffers, including a first output buffer and a second output buffer, wherein the first crossbar switch is coupled to the first output buffer and the second crossbar switch is coupled to the second output buffer, and wherein each crossbar switch is coupled to the number of columns of the instruction marking circuit to receive the instruction bytes.

18. The computer system of claim 16, wherein the branch predictor includes a branch target buffer.

19. The computer system of claim 16, wherein the branch predictor and instruction execution system are implemented in a microprocessor.

20. A method for marking instructions, comprising the steps of:
    receiving a first byte having branch information and a second byte having branch information;
    producing a taken branch signal when the branch information of the first byte indicates that the first byte is part of a predicted branch instruction;
    receiving the taken branch signal; and
    directly marking the second byte when the taken branch signal is received and the branching information of the second byte indicates that the second byte is part of a target instruction.

21. The method of claim 20, further comprising the step of discarding the first byte when the branch information of the first byte indicates that the first byte is unused.

22. The method of claim 20, further comprising the step of setting the branch information based on a branch prediction function.

23. The method of claim 20, further comprising the step of producing a target signal when the branching information of the second byte indicates that the second byte is part of the target instruction and when a target FIFO indicates that the second byte is part of the target instruction; and wherein the second byte is directly marked when both the target signal and the branch marking signal have been received.

* * * * *